United States Patent [19]

Lang

[11] Patent Number: 5,218,873
[45] Date of Patent: Jun. 15, 1993

[54] MASS FLOWMETER WORKING ON THE CORIOLIS PRINCIPLE

[75] Inventor: Michael Lang, Weil-Haltingen, Fed. Rep. of Germany

[73] Assignee: Endress & Hauser Flowtec AG, Switzerland

[21] Appl. No.: 647,919

[22] Filed: Jan. 30, 1991

[30] Foreign Application Priority Data

Mar. 30, 1990 [EP] European Pat. Off. .......... 90810258

[51] Int. Cl.$^5$ .............................................. G01F 1/84
[52] U.S. Cl. .................................................. 73/861.37
[58] Field of Search ............. 73/861.37, 861.38, 32 A; 335/229

[56] References Cited

U.S. PATENT DOCUMENTS

| | | | |
|---|---|---|---|
| 3,983,744 | 10/1976 | Agar | 73/32 A |
| 4,096,745 | 6/1978 | Rivkin et al. | 73/861.37 |
| 4,768,384 | 9/1988 | Flecken et al. | 73/861.38 |
| 4,793,191 | 12/1988 | Flecken et al. | |

FOREIGN PATENT DOCUMENTS

| | | |
|---|---|---|
| 0261436 | 3/1988 | European Pat. Off. |
| 8814606.5 | 9/1989 | Fed. Rep. of Germany |
| 06691 | 11/1987 | PCT Int'l Appl. |
| 02475 | 4/1988 | PCT Int'l Appl. |
| 03642 | 5/1988 | PCT Int'l Appl. |

*Primary Examiner*—Herbert Goldstein
*Attorney, Agent, or Firm*—Barnes & Thornburg

[57] ABSTRACT

This mass flowmeter is designed to be installed in pipelines having nominal diameters greater than about 150 mm. It has a support tube (11), a vibrating system (12) disposed axially in the support tube and consisting of two straight measuring tubes (21, 22) mounted in a holder (23, 15) at each of their ends, and a vibration exciter (50) which sets each measuring tube into natural-resonance flexural vibration at the center. The soft-magnetic armature (51) of the vibration exciter (50) is secured to one of the measuring tubes, and its electromagnet (52) is mounted in the wall of the support tube (11) opposite the armature (51) via the metallic, nonferromagnetic coil can (53) and contains a soft-magnetic core (54). The central portion (55) of the latter, which is disposed in an energizing coil (57), carries a permanent-magnet inset (58) at the end opposite the armature, and the edge portions (56) of the core (54) extend along the outside of the energizing coil. Vibration sensors (30, 31) for sensing the mechanical vibrations are mounted on both sides of and at preferably equal distances from the vibration exciter (50), and an evaluation circuit (60) is provided for determining the mass rate of flow from the phase difference of the signals delivered by the vibration sensors. This results in a very high efficiency and a linear excitation-current dependence of the vibration exciter.

20 Claims, 3 Drawing Sheets

MASS FLOWMETER WORKING ON THE CORIOLIS PRINCIPLE

The present invention consists in a mass flowmeter working on the Coriolis principle and designed to be installed in pipelines having nominal diameters greater than about 150 mm; it has a support tube, a vibrating system disposed axially in the support tube and comprising at least one straight measuring tube mounted in a distributer piece at each of its two ends, and a vibration exciter which sets the measuring tube(s) into natural-resonance flexural vibration at the center; the soft-magnetic armature of the vibration exciter is secured to one of the measuring tubes, and its electromagnet is mounted in the wall of the support tube opposite the armature via its metallic, nonferromagnetic coil can and contains a softmagnetic core; the central portion of the latter, which is disposed in an energizing coil, carries a permanent-magnet inset at the end opposite the armature, and the edge portions of the core extend at least partly along the outside of the energizing coil; finally, the mass flowmeter has vibration sensors for sensing the mechanical vibrations which are mounted on both sides of and at preferably equal distances from the vibration exciter, and an evaluation circuit for determining the mass rate of flow from the phase difference of the signals delivered by the vibration sensors.

As is well known, the measurement of the mass rate of flow with mass flowmeters of this type is based on the fact that Coriolis forces act on the fluid moving through the vibrating straight measuring tubes. As a result, the sections of the measuring tube at the inlet end vibrate out of phase with those at the outlet end. The magnitude of this phase difference is a measure of the mass rate of flow.

The phase difference is measured with vibration sensors which assign to the mechanical vibration an electrical quantity representative of the latter in magnitude and phase.

U.S. Pat. No. 4,768,384 discloses a mass flowmeter working on the Coriolis principle and comprising a support tube, a vibrating system disposed axially in the support tube and comprising at least one straight measuring tube mounted in a holder at each of its two ends, and a vibration exciter which sets the measuring tube(s) into natural-resonance flexural vibration at the center, the armature of the vibration exciter being secured to one of the measuring tubes, and its electromagnet being mounted in the wall of the support tube opposite the armature. This prior art mass flowmeter further includes vibration sensors for sensing the mechanical vibrations which are mounted on both sides of and at preferably equal distances from the vibration exciter, and an evaluation circuit for determining the mass rate of flow from the phase difference of the signals delivered by the vibration sensors. U.S. Pat. No. 4,768,384 does not indicate for which nominal pipeline diameters this mass flowmeter is suitable.

Conventional, commercially available Coriolis mass flowmeters with two straight parallel measuring tubes of titanium can be installed in pipelines having a maximum nominal diameter of 80 mm. During the development of mass flowmeters for twice that nominal diameter or even greater nominal diameters, it became apparent that the special design of the vibration exciter is particularly important for, inter alia, the following reasons.

The force exerted on the armature of the vibration exciter by its electromagnet must be proportional to the excitation current so that electronic tracking of the natural-resonance frequency is readily possible; if the force were proportional to, e.g., the square of the excitation current, the excitation of higher-order modes could not be prevented.

Furthermore, the vibration exciter should have a high efficiency and low eddy-current losses. It should be simple in construction and, thus, easy to manufacture and low in cost. Finally, the entire magnetic circuit of the exciter system should be designed so that at those points of the inner side of the measuring tube which lie in the region of the vibration exciter, any deposition of electromagnetic particles that may be contained in the fluid to be measured is avoided.

In a preferred embodiment of the invention, the measuring tubes and their holders are made of stainless steel. The soft-magnetic cores are preferably E- or bell-shaped cores.

The invention will now be explained in greater detail with reference to the accompanying drawings, which show an embodiment of the invention.

Figure 1:
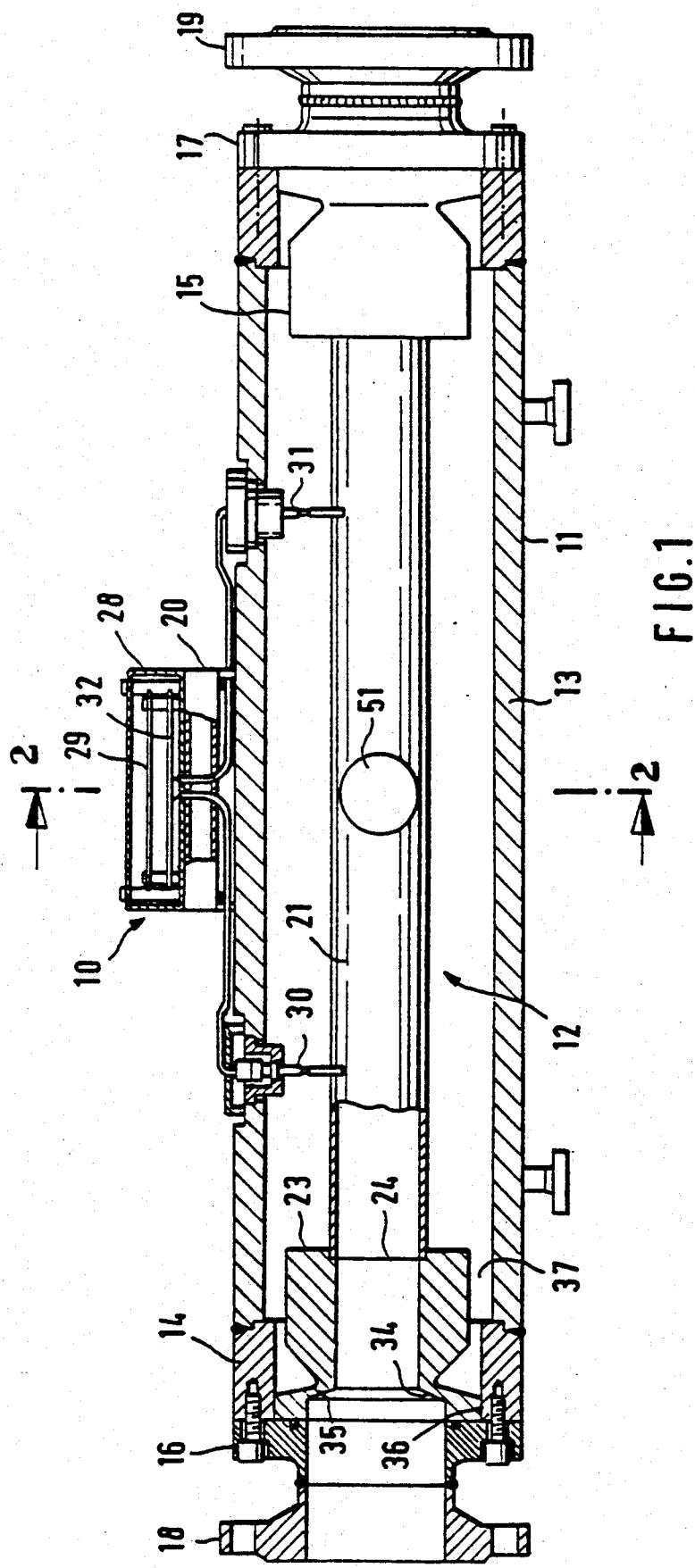
FIG. 1 is a partially sectioned side view of a mass flowmeter according to the invention.
Figure 2:
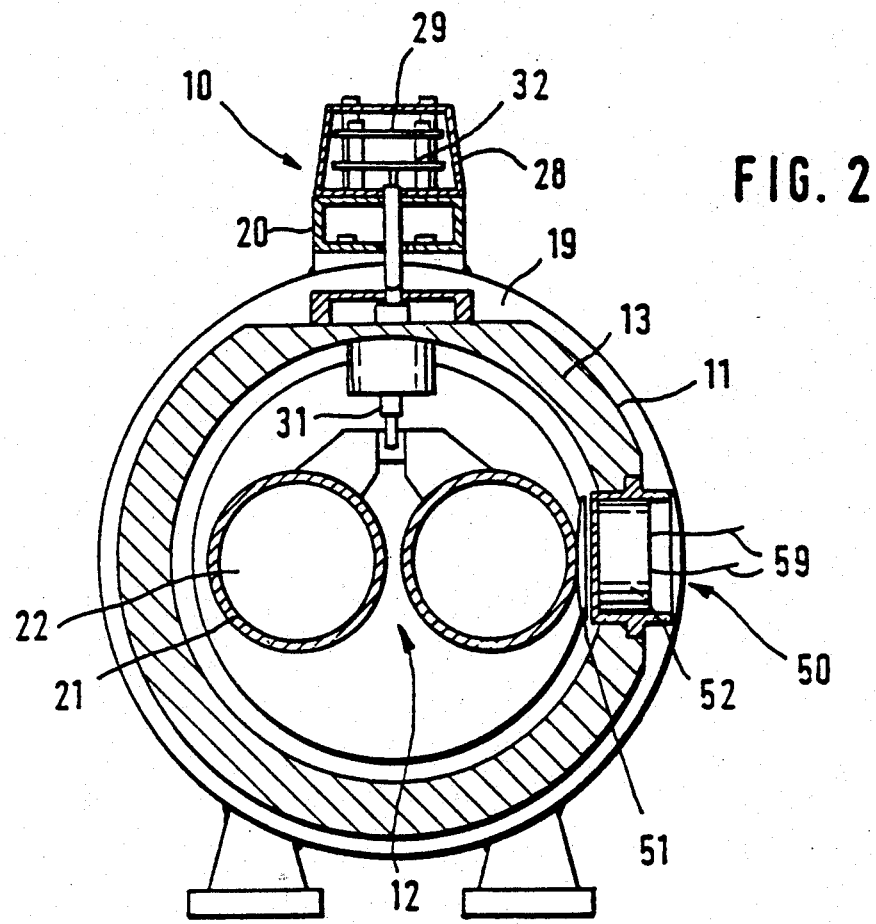
FIG. 2 is a section taken along 2—2 of FIG. 1.

The mass flowmeter 10 illustrated in FIG. 1 in a partially sectioned side view and in FIG. 2 in a section taken along line 2—2 of FIG. 1 has a solid support tube 11 which contains a mechanical vibrating system 12. The support tube 11 consists of a section of tube 13 welded at each end to an end socket 14. Screwed to each end socket is a connecting piece 16, 17 which carries a flange 18, 19. By means of the flanges 18 and 19, the mass flowmeter can be installed in a pipeline conducting the fluid whose mass rate of flow is to be measured. The support tube 11 may be surrounded by a sheet metal housing.

The vibrating system 12 consists of two parallel measuring tubes 21, 22 which are interconnected at both ends by a distributor piece 23 15 serving as a holder such that they are connected in parallel from a hydrodynamic point of view. The measuring tubes 21, 22 extend over the entire length of the section of tube 13, and the distributor pieces are of identical design and arranged in the same way, but only the distributor piece 23 in the end socket 14 is shown sectioned in FIG. 1. The following description of this distributor piece applies analogously to the distributor piece 15 at the other end of the vibrating system.

The distributor piece 23 contains channels 24 which divide the fluid coming through the connecting piece 16 evenly between the two measuring tubes 21, 22. Analogously, the distributor piece at the other end unites the flows of the two measuring tubes, so that the fluid flows off through the connecting piece 17. The direction of flow may also be reverse, of course.

A vibration exciter 50 (FIG. 2) is disposed in the middle of the support tube 11. It can set the two measuring tubes 21, 22 into oppositely directed flexural vibrations whose plane lies in the common plane of the two measuring tubes, i.e., perpendicular to the plane of the paper in FIG. 1. The vibration exciter 50 consists of an electromagnet 52, mounted in the wall of the section of tube 13, and a soft-magnetic armature 51, mounted opposite the electromagnet 52 on the measuring tube 21. When an alternating current flows through the coil of the electromagnet 52, the alternating force between the electromagnet 52 and the armature 51 sets the measuring tube 21 into flexural vibration which is coupled via the distributor pieces 23, 15 to the measuring tube 22, so that the two measuring tubes 21, 22 finally perform oppositely phased flexural vibrations. The sinusoidal excitation current comes from an electronic excitation circuit which is contained in a housing 28 secured to a sheet-metal housing 20; only its printed circuit board 29 is indicated. The excitation circuit is so designed that the vibrating system 12 is excited into natural-resonance vibration.

As was mentioned above, the measurement of the mass rate of flow by means of such a mass flowmeter is based on the fact that Coriolis forces act on the fluid flowing through the vibrating measuring tubes 21, 22, and that these forces result in a phase difference of the mechanical vibrations between the tube sections at the inlet end and the outlet end. The magnitude of this phase difference is a measure of the mass rate of flow. To measure this phase difference, two vibration sensors 30, 31 are mounted on both sides of and at preferably equal distances from the vibration exciter 50. They sense the mechanical vibrations of the measuring tubes 21, 22 and convert them into electric signals which are characteristic of the phases of the sensed vibrations. The sensor signals are fed to an electronic evaluation circuit which is also contained in the housing 28; only its printed-circuit board 32 is indicated. The evaluation circuit determines the mass rate of flow from the phase difference of the sensor signals applied to it.

The distributor piece 23 has a short tubular extension 34 integrally formed thereon which is connected with the inner edge of a ring-shaped diaphragm 35. The outer edge of the latter is connected with a holding ring 36 which is mounted in the end socket 14 and is axially supported by the slightly inwardly projecting end face of the connecting piece 16. The vibrating system 12 is thus axially suspended in the support tube 11 by means of the diaphragm 35 and the corresponding diaphragm at the other end. The distributor piece 23 has smaller cross-sectional dimensions than the cavity inside the end socket 14, so that there is a space 37 around the distributor piece between the circumference of the latter and the inner surface of the end socket 14. The only contact with the vibrating system 12 and the support tube 11 thus exists via the diaphragms 35 mounted at the two ends.

The tubular extension 34, the diaphragm 35, and the holding ring 36 may be formed integrally with the distributor piece of the holder 23. The diaphragm 35 is then simply a thin wall which is made of the material of the distributor piece and has such a small thickness that the diaphragm can deform elastically under load. The diaphragm could also, of course, be a separately made part which is sealed at the outer edge to a separate holding ring and at the inner edge to the connecting piece in a suitable manner, e.g., by welding. In any case, this subassembly is designed so that the coupling from one measuring tube to the other through the solid distributor piece is as close as possible, while the coupling of the vibrating system to the outer tube through the diaphragm is as weak as possible. The diaphragm suspension of the vibrating system 12 therefore provides excellent isolation of the mechanical flexural vibrations from the support tube 11 and from the connecting pieces 16, 17. Furthermore, different thermal expansions of the measuring tubes 21, 22 and the support tube 11 are compensated by the diaphragm 35, since the latter can deform elastically under an axial load. The necessary axial movement of the distributor piece is made possible by the space 37.

Figure 3:
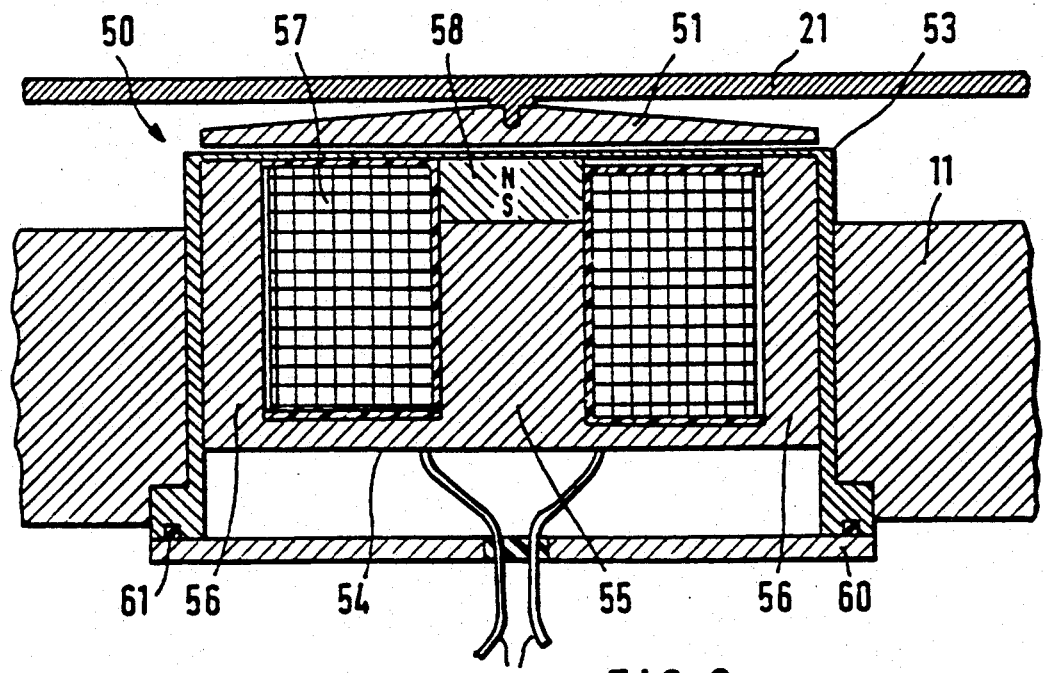
FIG. 3 is a cross-sectional view of the vibration exciter in situ.

A special feature of the mass flowmeter shown is the design of the vibration exciter 50, shown schematically in the cross-sectional view of FIG. 3. As mentioned, the soft-magnetic armature 51 is secured to the measuring tube 21. The electromagnet 52 comprises a coil can 53 of nonferromagnetic metal, which is mounted in the wall of the support tube 11 opposite the armature 51, a soft-magnetic core 54, which is fitted tightly into the coil can 53, and an energizing coil 57, which surrounds a central portion 55 of the core 54, while the edge portions 56 of the latter extend along the outside of the energizing coil 57. At the end facing the armature 51, the central portion 55 caries a permanent-magnet inset 58.

The leads 59 to the energizing coil 57 are passed through a cover 60 of the coil can 53, which is sealed by means of the cover 60, as is illustrated by an 0-ring 61. The cover is also made of soft magnetic meal.

Figure 4:
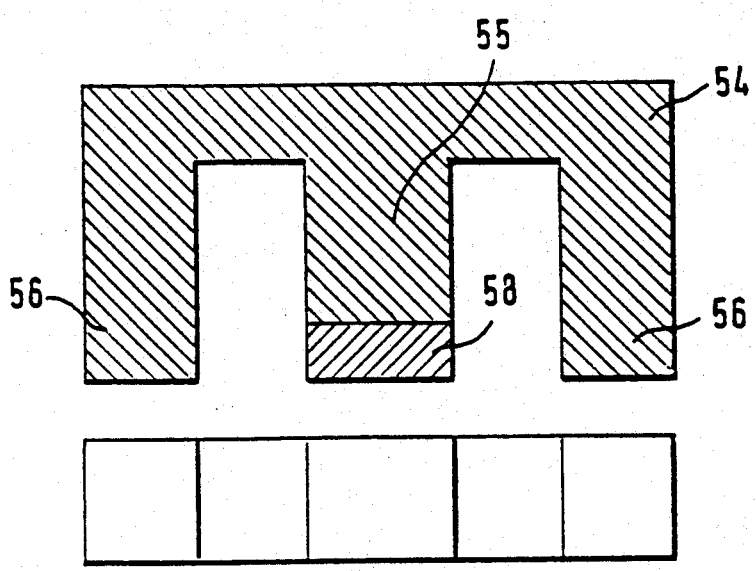
FIG. 4 is a side view and a plan view of an E-shaped core.
Figure 5:
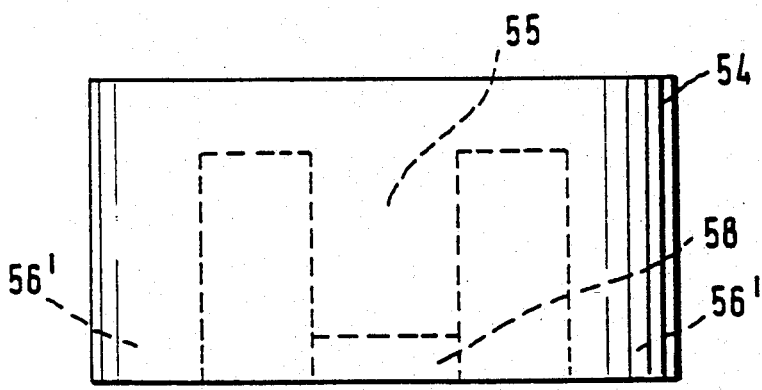
FIG. 5 is a side view and a plan view of a bell-shaped core.

FIG. 4 shows schematically that, in one embodiment of the invention, the core 54 may be an E-shaped core, while in the embodiment shown in FIG. 5, it may be a bell-shaped core. In the case of the bell-shaped core, the edge portion 56' is closed in the form of a ring, thus encompassing the energizing coil 57 laterally, while in the case of the E-shaped core, the two edge portions 56 extend only along part of the lateral surfaces of the energizing coil.

Through the permanent-magnet inset 58 in the core 54, the electric efficiency of the vibration exciter 50 is especially high. Furthermore, the premagnetization of the magnetic circuit by the inset 58 gives the desired linear relationship between excitation current and alternating force. Since the magnetic circuit is practically closed via the armature 51, there is no risk of ferromagnetic particles depositing on the inside of the measuring tube.

I claim:
1. A Coriolis mass flowmeter comprising:
a measuring tube having a first end and a second end;
a support member including means for supporting both the first and second ends of the measuring tube;
a magnetic armature coupled to the measuring tube; and
means for vibrating the measuring tube, the vibrating means including a core member having a central portion, means for coupling the core member to the support member so that the core member is located adjacent the armature, an energizing coil located adjacent the central portion of the core member, and a magnet coupled to an end of the central portion of the core member opposite from the armature for cooperating with the armature to vibrate the measuring tube.

2. The flowmeter of claim 1, wherein the means for coupling the core member to the support member includes a coil can coupled the the support member, the core member being located within the coil can.

3. The flowmeter of claim 2, wherein the coil can is made from a metallic nonferromagnetic material.

4. The flowmeter of claim 2, further comprising a cover for sealing the coil can.

5. The flowmeter of claim 4, further comprising a first and second leads extending through the cover, the first and second leads being coupled to the energizing coil.

6. The flowmeter of claim 1, wherein the core member includes edge portions extending at least partially over an outside surface of the energizing coil.

7. The flowmeter of claim 1, wherein the measuring tube is made of stainless steel.

8. The flowmeter of claim 1, wherein the core member is substantially E-shaped.

9. The flowmeter of claim 1, wherein the core member is substantially bell shaped.

10. The flowmeter of claim 1, wherein the core member is made from a soft magnetic material.

11. The flowmeter of claim 1, further comprising first and second sensors for sensing mechanical vibrations of the measuring tube and for generating signals proportional to the mechanical vibrations, the first and second sensors being mounted on opposite sides of the vibrating means, and an evaluation circuit coupled to the first and second sensors for determining the mass flow rate of a material passing through the measuring tube based on a phase difference between the signals from the first and second sensors.

12. In a Coriolis mass flowmeter including a support tube having a wall defining an interior region, at least one straight measuring tube located in the interior region of the support tube, the at least one measuring tube having first and second ends, means for supporting the at least one measuring tube at both the first and second ends within the interior region of the support tube, a magnetic armature coupled to the at least one measuring tube, first and second sensors for sensing mechanical vibrations of the at least one measuring tube and generating first and second signals representing the mechanical vibrations, and an evaluation circuit coupled to the first and second sensors for determining the mass rate of flow of a material passing through the at least one measuring tube from the first and second signals generated by the sensors, the improvement comprising means for vibrating the at least one measuring tube, the vibrating means including a core member having a central portion, means for coupling the core member to the support member so that the core member is located adjacent the armature, an energizing coil located adjacent the central portion of the core member, and a magnet coupled to an end of the central portion of the core member opposite from the armature for cooperating with the armature to vibrate the at least one measuring tube.

13. The flowmeter of claim 12, wherein the means for coupling the core member to the support member includes a metallic nonferromagnetic coil can coupled the the support member, the core member being located within the coil can.

14. The flowmeter of claim 12, wherein the core member includes edge portions which extend at least partially over an outside surface of the energizing coil.

15. The flowmeter of claim 12, wherein the core member is substantially E-shaped.

16. The flowmeter of claim 12, wherein the core member is substantially bell shaped.

17. The flowmeter of claim 12, wherein the core member is made from a soft magnetic material.

18. A Coriolis mass flowmeter comprising:
a support tube having a wall defining an interior region;
first and second measuring tubes each having a first end and a second end;
a first distributor piece coupled to the first ends of the measuring tubes for supporting the first ends of the measuring tubes within the support tube;
a second distributor piece coupled to the second ends of the measuring tubes for supporting the second ends of the measuring tubes within the support tube;
a magnetic armature secured to a center portion of the first measuring tube;
a vibration exciter for vibrating the first and second measuring tubes, the vibration exciter including an electromagnet having a metallic, nonferromagnetic coil can coupled to the wall of the support tube opposite from the armature, a soft-magnetic core member having a central portion, an energizing coil located adjacent the central portion of the core member, the core member having edge portions which extend at least partially over an outer surface of the energizing coil, and a magnet coupled to an end of the core member opposite from the armature for cooperating with the armature to vibrate the first and second measuring tubes.

19. The flowmeter of claim 18, wherein the core member is substantially E-shaped.

20. The flowmeter of claim 18, wherein the core member is substantially bell shaped.

* * * * *